Patented Aug. 17, 1948

2,447,099

UNITED STATES PATENT OFFICE 2,447,099

2-PHENYLINDENE DERIVATIVES AND PROCESS FOR THE MANUFACTURE OF SAME

Ulrich Volckmar Solmssen, Essex Fells, N. J., assignor to Hoffmann-La Roche, Inc., Nutley, N. J., a corporation of New Jersey No Drawing. Application August 23, 1944,
Serial No. 550,869

15 Claims. (Cl. 260—488)

This invention relates to new estrogenically active products and to a process for their manufacture.

It has been found in accordance with the present invention, that 2-phenylindenes corresponding to the structure

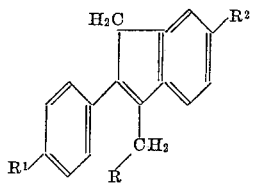

wherein R is a lower alkyl group and R¹ and R² are hydroxy, alkoxy or acyloxy groups, are characterized by high estrogenic action prolonged activity, and low toxicity. The may also be used for chemotherapeutic purposes.

Salzer, U. S. Patent #2,281,956, has described compounds corresponding to the above formulation where R is hydrogen, and has stated (compare page 1, lines 35 to 44 of the patent) that he was not able to produce such compounds where R was other than a hydrogen atom.

I have discovered that this difficulty can be overcome and that products which are adapted for substitution therapy in those physiological processes, estrogenic and otherwise, in which estrone normally takes part, are obtainable by reacting upon a p-alkoxy-phenylacetic-acid-alkali metal salt of the structure

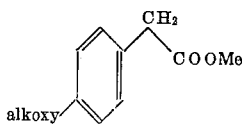

wherein Me stands for alkali metal with a meta-alkoxy-benzaldehyde which reaction yields α-(p-alkoxyphenyl)-m-alkoxy-cinnamic acid

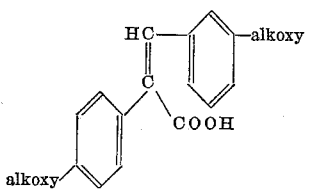

hydrogenating this cinnamic acid compound by any suitable means, such as catalytic hydrogenation in the presence of a noble or base metal catalyst or by the use of sodium amalgam, to yield the corresponding dihydrocinnamic acid which through cyclization by means of an acid condensing agent, such as HF or P₂O₅ in benzene, yields a mixture of two isomeric 2-(p-alkoxyphenyl)-bz-alkoxy-indanones

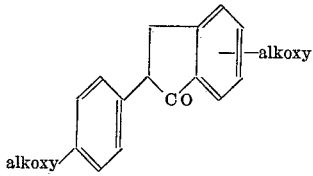

from which the compound

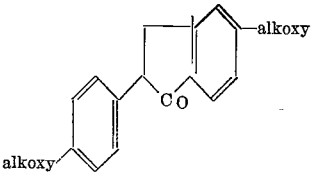

is separated and treated with an alkyl-magnesium halide RMgX to yield the alkylether

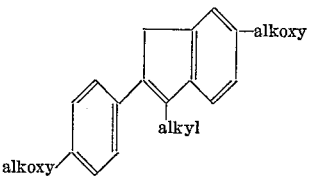

which is hydrolyzed to the corresponding phenolic structure which in turn can be acylated, as for example with acetic acid anhydride, propionylchloride, benzoylchloride and the like, to yield corresponding monoacyl or diacyl derivatives, which latter can be partially hydrolyzed to form monoacyl derivatives.

By this method, I have obtained for example:

2-p-methoxyphenyl-3-ethyl-6-methoxy-indene
2-p-hydroxyphenyl-3-ethyl-6-hydroxy-indene
2-p-acetoxyphenyl-3-ethyl-6-acetoxy-indene
2-p-propoxyphenyl-3-ethyl-6-propoxy-indene
2-p-acetoxyphenyl-3-ethyl-6-methoxy-indene.

The method given above is illustrative of the route but the mode of procedure may be varied. For example, the step of dealkylation, that is of hydrolyzing to the corresponding phenolic structure, can be performed with the dihydrocinnamic acid followed by cyclization. It is also possible to replace the alkoxy group in the starting materials with a group capable of ultimately being transformed to a hydroxy group, as for example an acetamino group. In this case the step of hydrolysis splits off the acyl group to yield a 2-p-aminophenyl-3-alkyl-6-amino-indene. This is then transformed by tetrazotization and boiling in water to the corresponding 2-p-hydroxyphenyl-3-alkyl-6-hydroxy-indene.

The compounds thus produced are characterized by marked estrogenic activity and prolonged activity. For example, 2 - p - acetoxyphenyl-3-ethyl-6-acetoxy-indene by subcutaneous dosage produces estrus in 50% of the mice tested at an average dose of 0.9 gamma. The corresponding unacylated compound requires a dose of 1.2 gamma. The compounds are also characterized by relatively low toxicity, and are effective by oral, sublingual or parenteral application.

The estrogenic compounds, as described above, can be hydrogenated to the corresponding indane derivatives, as for example 2-p-hydroxyphenyl-3-ethyl-6-hydroxy-indene on treatment with hydrogen in the presence of a base or noble metal catalyst yields 2-p-hydroxyphenyl-3-ethyl-6-hydroxy-indane, which is estrogenically active at an average dose of 1.8 gamma.

The following examples illustrate my invention:

Example 1

*Sodium salt of p-methoxyphenyl-acetic acid.*—The sodium salt was prepared by dissolving p-methoxyphenyl acetic acid in dry ether and adding one equivalent of sodium dissolved in absolute alcohol. The almost colorless precipitate was filtered off and dried, M. P. 197°.

*m - Methoxy - α - p - methoxyphenyl - cinnamic acid.*—99 gm. sodium p-methoxyphenyl acetic acid and 71.5 gm. m-methoxybenzaldehyde in 500 cc. glacial acetic acid were refluxed for six hours in an oil bath at 175°. After refluxing for two hours the reaction mixture became almost clear, but nearing the end of the reaction, crystalline reaction products began to precipitate. The reaction mixture was poured into water and allowed to stand for several hours. The crystalline precipitate was filtered off, washed with water and then treated with aqueous sodium carbonate solution on a steam bath. After cooling, the mixture was shaken with ether several times, the ether layer separated, washed with water and worked up as described below. The alkaline aqueous solution was acidified with hydrochloric acid and the resulting crystalline precipitate recrystallized from acetic acid. Yield 87 gm. (92.2%), M. P. 169°.

Anal.: Calc. for $C_{17}H_{16}O_4$: C=71.8, H=5.6. Found: C=71.9, H=5.8.

*m - Methoxy - α - p - methoxyphenyl-hydrocinnamic-acid.*—10.6 g. m-methoxy-α-p-methoxyphenyl-cinnamic acid dissolved in glacial acetic acid was hydrogenated at atmospheric pressure in the presence of palladium when the equivalent of 1 mol hydrogen was rapidly taken up. The crystalline residue was dissolved in ethanol and hot water added to the hot alcoholic solution until turbidity. Yield 8.5 g. (79.8%), M. P. 106°, colorless crystals.

Anal.: Calc. for $C_{17}H_{18}O_4$: C=71.3, H=6.3. Found: C=71.1, H=6.0.

*2-p-methoxyphenyl-6-methoxy - indanone-(3) and 2 - p - methoxyphenyl-4-methoxy-indanone-(3).*—14 g. of m-methoxy-α-p-methoxyphenyl-hydrocinnamic acid was dissolved in 450 cc. dry benzene in a 1-liter glass-stoppered bottle; 70 g. phosphoric pentoxide was added and the mixture shaken for 90 minutes. The reaction mixture was then poured on ice, ether added, the benzene-ether layer separated, washed with water, then with dilute sodium carbonate solution and again with water. On evaporation of the solvents, a crystalline residue was obtained which was separated into two components by crystallization in the following manner. The residue was dissolved in acetone with addition of Norit, filtered and petroleum ether added carefully so that no precipitate appeared while hot, but crystallization started when cooling. After one hour in the cold, the precipitate was filtered off, and once more crystallized from acetone/petroleum ether, M. P. 172°; yield 4.5 g. (34.4%).

Anal.: Calc. for $C_{17}H_{16}O_3$: C=76.0, H=6.0, $OCH_3$=23.1. Found: C=75.6, C=75.4; H=6.2, H=6.3; $OCH_3$=23.2.

The mother liquor was evaporated down to one-third of its volume and overnight in the ice-box the second crystalline fraction obtained. After recrystallization from methanol, M. P. 96°; yield =4.5 g. (34.4%).

Anal.: Calc. for $C_{17}H_{16}O_3$: C=76.0, H=6.0. Found: C=76.2, H=6.4.

The isomer M. P. 96° was distilled at 240–250° bath temperature/2 mm. The distillate is a light red oil which on scratching with ethanol gives the same crystals, M. P. 96°. The two isomeric indanone derivatives were also purified by chromatographic adsorption on aluminum oxide using a mixture of one part benzene and two parts petroleum ether as the solvent. The pure substances appear in the middle part of the column showing a bright green-blue fluorescence under the ultra-violet lamp. They were eluated from the adsorbent by a mixture of hot methanol and benzene.

*2 - p - methoxyphenyl - 3-ethyl-6-methoxy-indene.*—6 g. of substance, M. P. 96°, 2-p-methoxyphenyl-6-methoxy-3-indanone was dissolved in 100 cc. anhydrous benzene and diluted with 100 cc. anhydrous ether. This solution was added to the Grignard reagent prepared from 0.8 g. magnesium, 5.3 g. ethyl iodide and 50 cc. anhydrous ether. The reaction began spontaneously and was completed by refluxing for one hour, whereafter the ether was distilled off and the remainder refluxed for two more hours. After cooling, the mixture was poured on ice with addition of ammonium chloride, the benzene layer separated, dried and evaporated in vacuo. 6 g. of an orange-colored oil was obtained which was refluxed for two hours with 100 cc., 5%, aqueous sulfuric acid. The oil which then showed somewhat deeper color, was taken up in benzene, separated from the acid layer, washed with water and dried over sodium sulfate. The benzene solution was then passed, under suction through a tube (4 x 70 cm.) filled with aluminum oxide (Merck, ignited). A mixture of one part benzene and 2 parts petroleum ether was used for developing the chromatogram, the progress of which was followed under the ultra-violet lamp until the following zones were clearly discernible.

(a) 8 cm. wide. Various narrow zones—greenish fluorescence (top)
(b) 35 cm. wide. Uniform blue fluorescence
(c) 1 cm. wide. Slightly lighter blue fluorescence (bottom)

The zones were separated mechanically and eluated on the Buchner funnel with a mixture of methanol and benzene until the aluminum oxide showed only slight and the filtrate hardly any fluorescence. The methanol was removed by washing with water and the benzene solution evaporated in vacuo. The contents of zones (b) and (c) proved to be identical when the residues from the benzene solution were recrystallized from hot methanol, giving a total of 4.5 g. (71.4%) of the desired 2-p-methoxyphenyl-3-ethyl-6-methoxy-indene, M. P. 87–88°, peach-colored crystals.

Anal.: Calc. for $C_{19}H_{20}O_2$: C=81.4, H=7.2. Found: C=81.7, H=7.3.

Example 2

*2-p-hydroxyphenyl - 3 - ethyl - 6 - hydroxy-indene.*—1.8 g. of 2-p-methoxyphenyl-3-ethyl-6-methoxy-indene dissolved in 24 cc. glacial acetic acid was treated with 6 cc. hydrobromic acid (48%). On heating the solution became clear and was refluxed under $CO_2$ for 70 min. The reaction mixture was diluted with water and made alkaline under cooling. A dark oil precipitated and was removed by extraction with ether. The aqueous alkaline layer was filtered, acidified with HCl, and three times extracted with ether. The residue from the evaporated either solution was dissolved in benzene and passed through a tube filled with aluminum oxide (Merck, ignited) and the chromatogram developed with a mixture of 1 part acetone and 3 parts benzene. A dark brown followed by a yellow zone on top of the column presumably contained decomposition products. The lowest main zone with uniform blue fluorescence under the ultra-violet lamp was separated and the adsorbed material eluated with dilute aqueous sodium hydroxide. The alkaline solution was filtered from aluminum oxide and upon acidification with HCl a light brown crystalline precipitate was obtained. After recrystallization from dilute ethanol, the substance was obtained in slightly colored crystals, M. P. 136°, which tend to decompose on exposure to air.

Anal.—The substance contained no methoxyl. Calc. for $C_{17}H_{16}O_2 \cdot \frac{1}{4}H_2O$: C=79.5, H=6.4. Found: C=79.8, C=79.5, H=6.5.

After saponification of the di-propionic ester described below, the di-hydroxy derivative was again obtained as the same unstable and slightly colored, though crystalline product, M. P. 136°, giving the same analysis low in carbon.

Example 3

*2-p-acetoxyphenyl - 3 - ethyl - 6 - acetoxy - indene.*—200 mgm. 2-p-hydroxyphenyl-3-ethyl-6-hydroxy-indene was refluxed for three hours with 15 cc. acetic anhydride and 1 g. anhydrous sodium acetate. After cooling, the reaction mixture was diluted with water and an oil separated which soon crystallized. After recrystallization once from dilute ethanol and twice from ligroin (B. P. 70–90°), the substance was obtained in almost colorless crystals, M. P. 118–120°. Contrary to the free hydroxyl compound, the acetylated derivative is perfectly stable.

Anal.: Calc. for $C_{21}H_{20}O_4$: C=75.0, H=6.0. Found: C=75.3, H=6.3.

Example 4

*2-p-propoxyphenyl - 3 - ethyl - 6 - propoxy-indene.*—650 mgm. of 2-p-hydroxyphenyl-3-ethyl-6-hydroxy-indene were dissolved in 5 cc. dried pyridine, 3 g. propionic anhydride (redist.) were added, and the mixture refluxed under nitrogen for 90 min. at 105° bath temperature. After cooling and diluting with water, an oil separated which crystallized slowly on standing in the cold. After repeated recrystallization from methanol, the dipropionic ester crystallized in colorless leaflets, M. P. 88–89°.

Anal.: Calc. for $C_{23}H_{24}O_4$: C=75.8, H=6.6. Found: C=75.8, H=6.8.

Example 5

*2 - p -acetoxyphenyl - 3 - ethyl- 6 -methoxy-indene.*—2-p-methoxyphenyl- 3-ethyl-6-methoxy-indene-(2,3) was demethylated by refluxing in 48% HBr under $CO_2$ for 70 minutes. After cooling the mixture is diluted with water, made just alkaline to litmus and shaken with ether. The ether solution is then shaken with 5% sodium hydroxide. The ether layer is washed with water and evaporated. The residue acetylated in the usual manner yields colorless needles from 2-p-acetoxyphenyl-3-ethyl-6-methoxy-indene, melting at 135–135.5°, after repeated recrystallization.

Anal.: Calc. for $C_{20}H_{20}O_3$: C=77.9, H=6.5, $OCH_3$=10.1. Found: C=77.9, H=6.4, $OCH_3$=10.1.

Example 6

*2-(p-hydroxyphenyl) - 3 - ethyl- 6 -hydroxy-indane.*—Two grams of 2-(p-methoxy-phenyl)-3-ethyl-6-methoxy-indene, M. P. 87–88°, was dissolved in 30 cc. of hot absolute methanol and hydrogenated in the presence of palladium. One mole of hydrogen was taken up within two and one half hours, the catalyst was filtered off, the filtrate evaporated in vacuo and the remaining oil dissolved in 25 cc. of glacial acetic acid and 6 cc. of hydrobromic acid (48%). After refluxing under nitrogen for two hours, the reaction mixture was diluted with water and made strongly alkaline with sodium hydroxide. Some tarry material separated but went almost completely into solution when warming the mixture on the steam-bath. The alkaline solution was shaken three times with ether the extract being discarded. The aqueous layer was filtered, acidified with hydrochloric acid, extracted three times with ether and the combined ether extracts washed repeatedly with water until the washings were no longer acid to congo. The ether solution was dried over sodium sulfate, evaporated in vacuo and the residue recrystallized first from benzene, then repeatedly from ethanol; yield 1.25 g., M. P. 162–163°.

Anal.: Calc. for $C_{17}H_{18}O_2$: C=80.2, H=7.2. Found: C=80.3, H=7.0.

What I claim is:

1. 2-(p-acetoxyphenyl) - 3 - ethyl- 6 -methoxy-indene.

2. 2- (p-acetoxyphenyl) -3-ethyl-6-acetoxy-indene.

3. 2- (p-hydroxyphenyl) - 3 -ethyl- 6 -hydroxy-indane.

4. A compound selected from the group consisting of the 2-phenylindenes corresponding to the following formula:

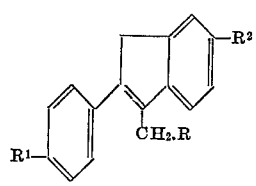

wherein R is a lower alkyl radical, and $R^1$ and $R^2$ are each selected from the group consisting of the hydroxy, alkoxy, and acyloxy groups, and the corresponding 2-phenylindanes.

5. The process for the manufacture of 2-phenylindanes which comprises hydrogenating 2-phenylindenes corresponding to the formula:

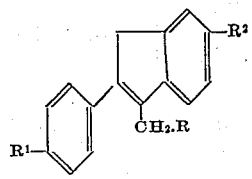

wherein R is a lower alkyl group, and $R^1$ and $R^2$ are each selected from the group consisting of hydroxy, alkoxy, and acyloxy groups, to the corresponding 2-phenylindanes.

6. The process for preparing 2-phenylindenes, which comprises reacting a p-alkoxy-phenyl-acetic-acid alkali metal salt with a m-alkoxy-benzaldehyde to obtain an alpha-(p-alkoxy-phenyl)-m-alkoxy cinnamic acid, hydrogenating this cinnamic acid compound to yield the corresponding dihydrocinnamic acid, treating this acid with an acid condensing agent to obtain a 2-(p-alkoxy-phenyl)-bz-alkoxy-indanone, and treating the indanone with an alkyl-magnesium halide to yield the corresponding 2-phenyl indenes.

7. The process of manufacturing 2-phenylindane compounds which comprises reacting a p-alkoxy-phenylacetic-acid alkali metal salt with a m-alkoxy-benzaldehyde to obtain an alpha-(p-alkoxyphenyl)-m-alkoxy-cinnamic acid, hydrogenating this cinnamic acid compound to yield the corresponding dihydrocinnamic acid, treating this acid with an acid condensing agent to obtain a 2-(p-alkoxy-phenyl)-bz-alkoxy-indanone, treating the indanone with an alkyl-magnesium halide to obtain a 2-phenylindene, dealkylating the resultant alkoxy indene to convert at least one alkoxy group to an hydroxy group and to obtain a corresponding hydroxy indene, and hydrogenating the hydroxy indene to obtain the corresponding 2-phenylindane.

8. The process of preparing 2-phenylindanes, which comprises reacting an alkali metal salt of phenylacetic acid substituted in the para-position by a member of the group convertible into hydroxyl consisting of alkoxy and acetamino radicals, with a m-alkoxy-benzaldehyde, to obtain an alpha-(p-substituted phenyl)-m-alkoxy-cinnamic acid, hydrogenating this cinnamic acid to obtain the corresponding dihydrocinnamic acid, cyclicizing this acid by means of an acid condensing agent, and treating the resultant indanone with an alkyl-magnesium halide to obtain a substituted 2-phenylindene, and hydrogenating this indene to form the corresponding indane.

9. The process for preparing substituted 2-phenylindenes which comprises reacting an alkali metal salt of phenylacetic acid substituted in the para-position by a member of the group convertible into hydroxyl consisting of alkoxy and acetamino radicals with a m-alkoxyl-benzaldehyde, to obtain an alpha-(p-substituted phenyl)-m-alkoxy-cinnamic acid, hydrogenating this cinnamic acid to obtain the corresponding dihydrocinnamic acid, cyclicizing this acid by means of an acid condensing agent, and treating the resultant indanone with an alkyl-magnesium halide to obtain a substituted 2-phenylindene.

10. The process of claim 8 in which an alkoxy-substituted indene is dealkylated to obtain an hydroxy-indene, followed by hydrogenation of the hydroxyindene to the corresponding indane.

11. The process of claim 8 in which hydrogen fluoride is used as a condensing agent.

12. The process of claim 8 in which phosphorous pentoxide in benzol is used as a condensing agent.

13. 2-(p-acetoxyphenyl)-3-lower alkyl-6-acetoxy-indenes, wherein the lower alkyl radical contains at least two carbon atoms.

14. 2-(p-hydroxyphenyl)-3-lower alkyl-6-hydroxy-indanes, wherein the lower alkyl radical contains at least two carbon atoms.

15. The process for the manufacture of 2-(p-hydroxyphenyl)-3-ethyl-6-hydroxy-indane which comprises hydrogenating a 2-(p-methoxyphenyl)-3-ethyl-6-methoxy-indene and dealkylating the reaction product to convert the methoxy groups into hydroxyls.

ULRICH VOLCKMAR SOLMSSEN.

REFERENCES CITED

The following references are of record in the file of this patent:

UNITED STATES PATENTS

| Number | Name | Date |
|---|---|---|
| 1,754,052 | Rosenthal | Apr. 8, 1930 |
| 2,281,956 | Salzer | May 5, 1942 |